April 4, 1961     E. V. BERGSTROM     2,978,279
METHOD AND APPARATUS FOR TRANSFERRING CONTACT MATERIAL
Filed Dec. 20, 1951     3 Sheets-Sheet 1
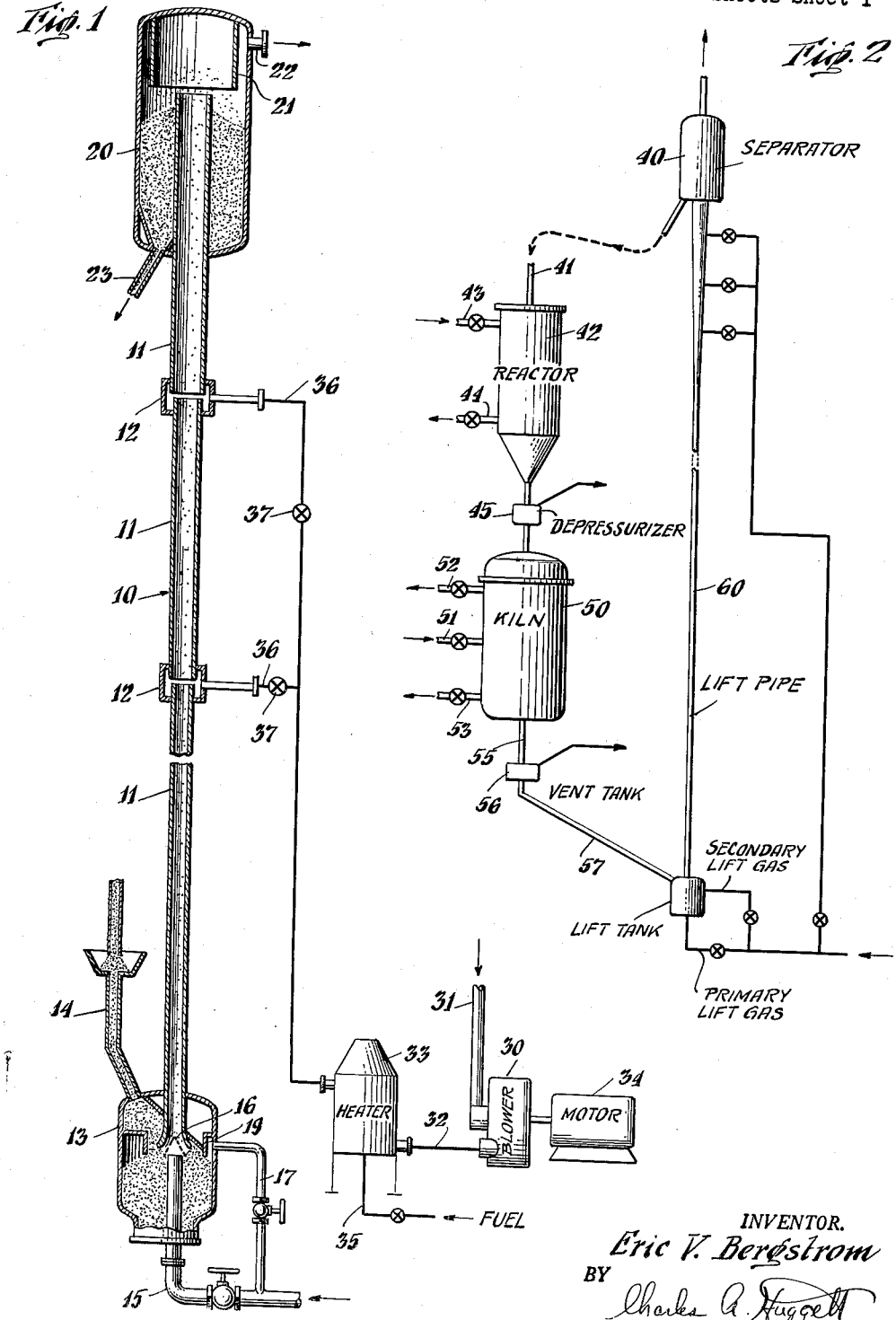
INVENTOR.
Eric V. Bergstrom
BY
Charles A. Huggett
AGENT

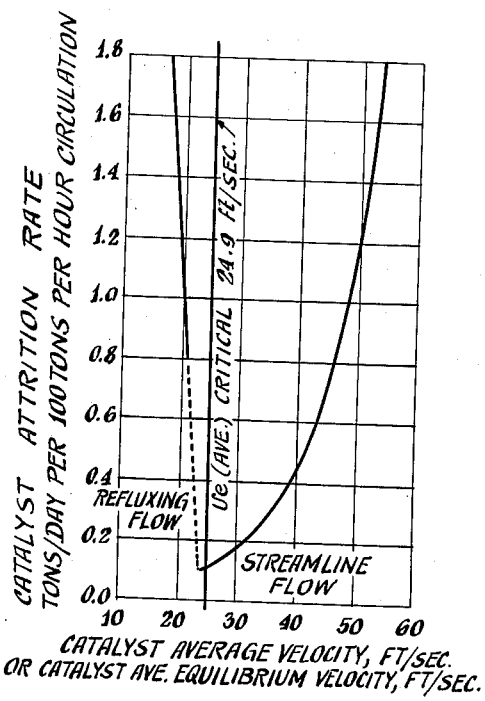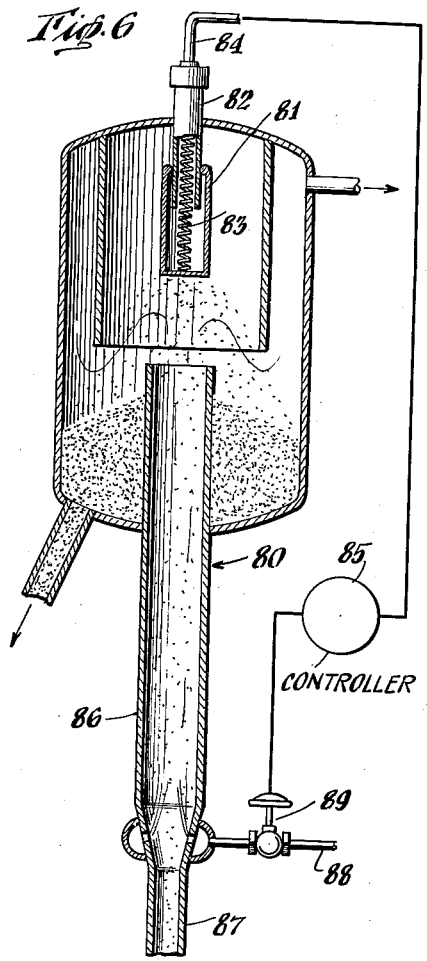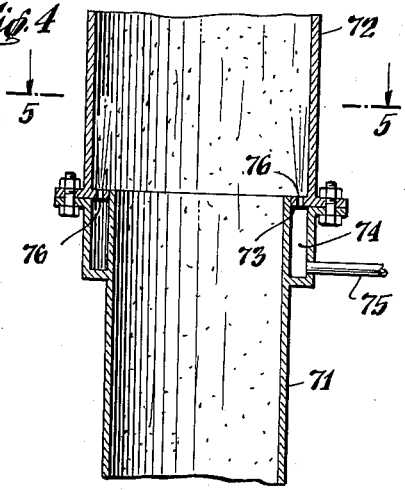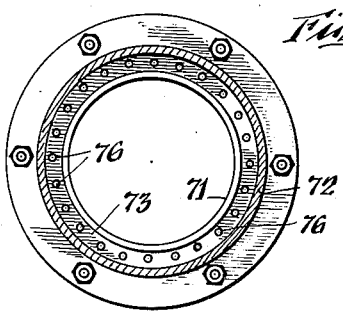

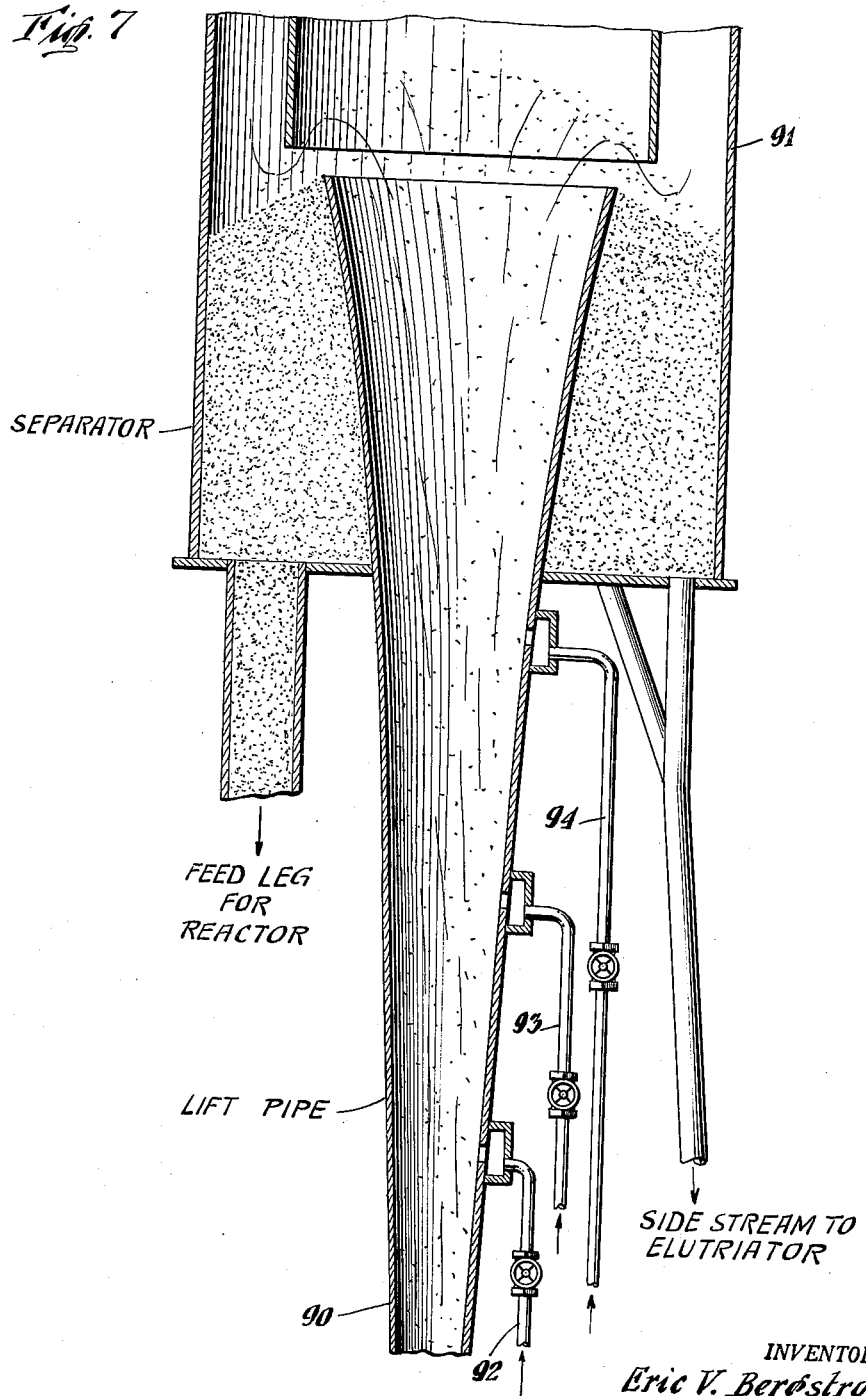

United States Patent Office 2,978,279
Patented Apr. 4, 1961

2,978,279

METHOD AND APPARATUS FOR TRANSFERRING CONTACT MATERIAL

Eric V. Bergstrom, Short Hills, N.J., assignor to Socony Mobil Oil Company, Inc., a corporation of New York Filed Dec. 20, 1951, Ser. No. 262,639

5 Claims. (Cl. 302—53)

This invention is concerned with the upward transfer of granular solids by the medium of a stream of lifting gas. It has particular application in the petroleum industry to those chemical conversion processes which utilize a continuously moving mass of refractory particles as a heat carrying or catalytic material.

In the petroleum industry many processes are known in which hydrocarbons are converted in the presence of a solid, particle-form material to more desirable substances. During the rearrangement of the structure of the hydrocarbons, the particles receive a deposit of carbonaceous material which must be periodically removed. In a preferred procedure, granular contact material is used, arranged in the form of gravitating substantially compact columns. The reactants are continuously introduced into a reaction zone and passed through the column of contact material. The zone is maintained at a suitable pressure and temperature for the conversion and converted products are continuously removed from the zone. The contact material is withdrawn from the bottom of the column and introduced onto the top of a column of the material in a reconditioning zone. A combustion supporting gas, such as air, is introduced into the column in the reconditioning zone to burn off the carbonaceous deposits. The reconditioned contact material is withdrawn from the bottom of the reconditioning zone and returned to the top of the column in the conversion zone. When the columns are arranged side by side, the contact material must be lifted from the bottom of one column to the top of the other column. When the columns are arranged one above the other, the contact material must be lifted from the bottom of the lower column to the top of the other column. This invention deals particularly with a method and means for lifting the granular particles in a confined gas stream.

Examples of various processes in this industry which use granular catalyst are polymerization, dehydrogenation, cyclization, coking, desulfurization and catalytic cracking. This invention will be illustrated in conjunction with a catalytic cracking process, being understood, however, to apply broadly to any process or operation in which it is desired to lift a solid material in particle form with minimum particle attrition and metal erosion.

In the moving bed system of catalytic cracking, the particles in granular form are contacted with suitably prepared hydrocarbons while gravitating downwardly through a reaction zone in the form of a substantially compacted column. The feed stock, usually a gas oil boiling somewhat above the gasoline boiling range, cracks in the presence of the catalyst, forming substantial amounts of hydrocarbons which do boil in the gasoline boiling range. Incident to the cracking operation, a deposit of carbonaceous material or coke is formed on the catalyst impairing its ability to function catalytically. The coked or spent catalyst is removed from the bottom of the reaction zone continuously and transferred to the top of a gravitating substantially compact column of particles in a regeneration zone. The catalyst gravitating through the regeneration zone is contacted with a combustion supporting gas, such as air, to burn off the coke deposits from the surface of the catalyst. The coke-free or regenerated catalyst is withdrawn continuously from the bottom of the column in the regeneration zone and transferred to the top of the reaction zone, completing the continuous path. This process involves the use of high temperatures and may involve the use of high pressure. For example, the reaction zone may be maintained at about 800–1100° F., suitable cracking temperature, and the regeneration zone may be maintained at about 1000°–1300° F., suitable regeneration temperature. The catalyst is lifted, therefore, at temperatures of approximately 800–1200° F., or thereabouts.

The particles may take the form of pellets, pills, uniform granules or spheres; spheres or beads being preferred. The particle size may range from about 0.005 to 0.5 inch and preferably from about 4–20 mesh by Tyler standard screen analysis. The catalytic material may be natural or treated clays such as beauxite, bentonite, montmorillonite, or kaolin or may take the nature of certain synthetic associations of silica, alumina, silica and alumina, alumina-chromia, alumina-molybdenum oxide, etc., with or without the addition of various other metallic oxides. These materials are well known in the petroleum and related arts, being produced in the form of hard refractory particles having enormous adsorptive surface in relation to their size. For reactions in which the solid material acts mainly as a heat carrying medium, it may take the nature of fused alumina, Carborundum, quartz, metal balls or fragments or capsules of corhart material, etc. The poured density of the contact material is between about 20–130 lb. per cubic foot, being the density of particles which are poured into a receptacle without packing or tamping. In the case of adsorbents, the density is preferably within the range of about 25–60 pounds per cubic foot.

When moving beds of granular catalyst in substantially compact columnar form are used in catalytic cracking or other conversion processes, it is highly desirable to avoid the attrition or breakage of the particles with consequent production and accumulation of fines. For this reason, primarily, prior catalytic cracking systems have used bucket elevators to raise the catalyst. These elevators have practical limitations of height and capacity, thereby imposing limitations upon the entire system. For example, commercial units have been limited to a side by side arrangement of the vessels with two elevators being used to complete the system. The catalyst circulation rate has been held to a low value because of the limited elevator capacity. In order to effect certain economies in the system and provide an improved system, it was found necessary to use a superimposed arrangement of vessels with a single elongated lift and a circulation rate higher than previously employed. The elevators formerly employed were not satisfactory. Gas lifts have been considered previously as a means of lifting granular catalyst, but no practical method or apparatus had been developed, heretofore, in spite of extensive research effort. The prior lifts failed primarily because they caused excessive catalyst attrition or breakage, and also because of their excessive power requirements. One of the principal reasons for high attrition, it has been discovered, was the inability to properly control the gas velocity along the lift pipe. Prior art lifts characteristically involved a substantial pressure drop between the ends of the lift. This resulted in gas expansions along the path of flow and catalyst and lift gas shot out of the pipe at the upper end at high velocity, causing the particles to hit metal surfaces at high velocity and also causing the particles to rise a substantial distance before starting a long fall onto the bed surface at the top of the pipe. The particles attained sufficient velocity during their long fall to cause excessive attrition when they collided with the substantially compact bed about the lift pipe.

The object of this invention is to provide apparatus for and a method of transferring granular material upwardly through a gas lift passage which makes possible a delicate control of particle velocity in the top of the lift passage without regard to the velocity of the particles in the bottom of the passage.

A further object of this invention is to provide apparatus for and a method of transferring granular material upwardly through a gas lift passage which makes possible control of the discharge velocity of the particles from the top of the passage independent of the velocity of the particles at the bottom of the passage.

A further object of this invention is to provide apparatus for and a method of transferring granular material upwardly through a gas lift passage which makes possible the control of the height to which the particles rise above the top of the passage below a safe level independent of the velocity of the particles in the bottom of the passage. These and other objects of this invention will become apparent from the following description of the invention.

Early gas lift studies were predicated on the theory that minimum breakage of the granular contact material would be encountered when the lowest gas velocities were used which would lift the material through the lift passage. It was discovered, however, that at such low gas flow rates the attrition of the granular solids was very high. In fact, the attrition in the case of catalysts of the most durable type known was far in excess of that which could be economically tolerated in commercial continuous catalytic cracking systems. Moreover, it was discovered that for a given pneumatic lift installation the rate of catalyst attrition unexpectedly fell off very sharply as the rate of gas and catalyst flow along the lift passage increased until a critical velocity was reached at which attrition was less susceptible to velocity change. Upon further increase in velocity the attrition rate again increased but at a more gradual rate. It was found that unexpectedly the critical minimum average gas and catalyst velocity is dependent upon the length of the lift passage and that for any given lift passage the necessary delicacy of control over the attrition cannot be attained at average gas and catalyst velocities below the critical minimums. It was also discovered that the catalyst attrition rate could be further substantially reduced by maintaining the linear rate of catalyst flow as it emerges from the upper end of the lift passage below a critical maximum above which the rate of attrition increased at an extremely rapid rate.

It is possible to so taper the lift pipe that for a given operation the gas velocity along the lift is within the critical range conducive of minimum attrition and so that the catalyst discharges within a critical velocity range also conducive of minimum attrition. Such an arrangement is shown in case Serial Number 210,942, filed February 14, 1951, now Patent No. 2,770,504, granted Nov. 13, 1956.

In the present invention, however, the pipe is overtapered so that when the gas velocity is maintained within the range required for minimum attrition in the lower portion of the lift passage, the catalyst velocity, in the absence of further modification, drops below the range of minimum attrition in the remainder of the lift, so that refluxing of the catalyst occurs in the lift. Then additional lift gas is introduced into the overtapered lift passage at one or more intermediate points along its length in amounts sufficient to maintain the velocity in the lift and at the discharge from the lift within the range in which attrition losses will be lowest.

The invention will be disclosed in detail in the following sketches, all highly diagrammatic in form, and the subsequent discussion of the apparatus and operation of the apparatus shown in the sketches.

Figure 1 is an elevational view in section of a gas lift adapted to raise granular solids by gas flow.

Figure 2 is a gas lift incorporated in a moving bed conversion system.

Figure 3 is a graph showing the relationship between catalyst average velocity and attrition rate in the operation of pneumatic lifts of the type here involved.

Figure 4 is a fragment of the lift pipe in section illustrating a gas introduction means.

Figure 5 is a plan-view of Figure 4 as seen on plane 4—4.

Figure 6 illustrates a scheme of automatic operation of the gas lift.

Figure 7 shows the top section of a gas lift which is an alternate embodiment of the invention.

Referring now to Figure 1, the lift pipe 10 is a substantially vertical tube formed by sections 11, 11', 11''. Each section is larger in diameter than the section below, and the adjacent ends are connected together by housings 12, 12. The feed pot or tank 13 is located at the bottom of the pipe 10 and the separator 12 is located at the top of the pipe with the ends of the pipe projected into each vessel. Gravitating granular material in substantially compacted form is introduced into the top of the feed tank 13 through the conduit 14, forming a bed of the material about the lower end of the lift pipe. A primary lift gas is introduced through the conduit 15 to pass up the lift pipe without passing through any substantial thickness of the granular bed. The end of the conduit is terminated beneath the lift pipe entrance at a level above the surface of the granular bed. A screen 16 prevents granular material from falling into the conduit 15 when the gas flow is stopped. A secondary lift gas is introduced into the bed through the conduit 17 at a location a substantial distance away from the lower end of the lift pipe so as to pass through a substantial thickness of the bed. The secondary gas pushes the granular particles into the stream of primary gas where they are suspended and lifted up the pipe. The secondary gas normally varies between about 5–15 percent of the total gas flow, depending upon the flow rate desired for the granular material. The valve 18 provides means for controlling the flow rate of the secondary gas stream and, hence, the flow rate of the granular material. The ring baffle 19 provides a suitable means of introducing the secondary gas into the bed at locations around the pipe, thereby providing more uniform feeding of the particles. Suitable lift tanks for feeding catalyst into the lift pipe are shown in copending cases Serial No. 75,642, filed February 10, 1949, now Patent No. 2,684,927, granted July 27, 1954, and Serial No. 76,017, filed February 12, 1949, now Patent No. 2,666,731, granted Jan. 19, 1954. This case applies to any of the modifications described in the copending cases, as well as to lifts having other types of feed means.

The settling vessel 20 is located at the top of the lift pipe and is substantially larger in cross-section than the lift pipe, causing the velocity of the lift gas to decrease after it leaves the lift pipe. The gas makes a reversal around the skirt baffle 21 and is withdrawn through the conduit 22. The upper end of the lift pipe is terminated intermediate the top and bottom of the settling vessel, providing a surge space in the bottom of the vessel about the pipe. The granules separate from the gas and fall onto the surface of a bed of the material in the bottom of the vessel. The granular material is withdrawn from the settling vessel through the conduit 23 as a substantially compact column for use in any chemical or physical process, not shown, and the granules discharged from the process may be introduced into the conduit 14 to complete an enclosed cycle, if desired.

The lift gas may be any suitable gas, such as, for example, air, flue gas, nitrogen or superheated steam. The flow of primary gas is adjusted to provide stable, uniform lifting of the particles at the bottom of the pipe and the flow of secondary gas is controlled to regulate the amount or flow rate of solid particles lifted through the pipe. The lift pipe sections are spaced apart to provide horizontal slots between their ends. The lift gas is introduced into the bottom of the pipe at sufficient velocity to provide smooth feeding of the material into the bottom of the pipe, and smooth flow in the lower portion of the pipe or at least at the bottom of the pipe. As the gas pressure drops along the pipe, the gas velocity increases. This tendency is counteracted by placing sections of pipe, each having a larger diameter, appropriately so that the gas velocity is reduced as it enters each new section. This produces a stepwise tapered lift with maximum lift diameter at the top and minimum at the bottom. Other types of tapered lifts could be used in this invention such as one having a gradual taper from bottom to top or any of the other tapered designs shown in copending application, Serial No. 210,942, filed February 14, 1951.

It has been found that if the average gas and catalyst velocities in the pneumatic lift passage fall below a certain critical minimum which depends upon certain features of the lift pipe hereinafter discussed, the catalyst attrition rate will increase very rapidly for even small increments of gas and catalyst velocity decline. This is well illustrated by the plot shown in Figure 3 in which the abscissa represents catalyst average velocity or catalyst average equilibrium velocity and the ordinate represents catalyst attrition rate in tons per day per 100 tons per hour catalyst throughput. The catalyst average equilibrium velocity may be defined as the excess of the gas average velocity under the conditions of temperature and pressure involved over the catalyst average terminal velocity. This average terminal velocity is the averaged terminal velocity of all the particles averaged for the entire length of the lift passage. In other words, the total average linear gas velocity $U_g$ is equal to the catalyst average equilibrium velocity plus the catalyst average terminal velocity over the entire length of the lift passage. It has been found that in general the catalyst average velocity for a given tapered lift conduit designed for minimum attrition all along the lift is approximately equal to the catalyst equilibrium velocity. The data plotted on Figure 3 was taken in actual operation of a 200 ft. high tapered lift pipe having an internal diameter of 15⅜ inches at its lower end and 20⅛ inches at its upper end. As can be seen from Figure 3 in the case of this particular system, there is a definite minimum and break in the velocity-attrition curve at a catalyst average equilibrium velocity of approximately 25 feet per second. The critical average minimum gas velocity for this lift pipe is 25 feet per second plus the average terminal velocity for the particles under the average conditions in the lift pipe. It has been found from a study of a number of different lift pipes that the critical average minimum gas velocity increases with increasing overall length of lift pipe, and for a given lift pipe the critical minimum gas velocity in the lift pipe is progressively greater at successively lower levels. It has been found that for a given lift pipe the critical catalyst equilibrium velocity at the lower end of the lift pipe is substantially twice the average critical catalyst equilibrium velocity. It will be noted that above the critical minimum velocity the catalyst attrition rate increaes but at a substantially lower rate than below the minimum velocity. It is presently believed that the rapid increase in attrition below the minimum velocity may be due to the tendency for catalyst surging or refluxing in the lift pipe which refluxing is eliminated at and above the critical catalyst and gas velocities. Above these critical velocities the catalyst attrition rate gradually increases for two reasons, first because aside from attrition losses within the lift pipe itself a separate or additional catalyst attrition occurs in the catalyst-gas separation and catalyst collection step in the separator at the upper end of the lift pipe, which additional attrition increases with increasing catalyst actual velocity at the upper end of the lift pipe, and secondly because above a certain maximum velocity within the lift the attrition caused by catalyst particle intercollision and collision with the lift pipe wall becomes appreciable and rapidly increases with further velocity increase.

When the gas lift pipe is tapered to effect the catalyst equilibrium velocity at each level which effects minimum catalyst attrition, the operation of the lift is substantially limited to the precise conditions for which it was designed. It is often desirable to have a lift which can be adapted for use under widely varying conditions. Therefore, in this invention the lift pipe is overtapered so that if the correct catalyst equilibrium velocity is used in the bottom of the pipe the velocity will be too low in the rest of the pipe, yielding overall average gas and catalyst velocities in the lift which cause refluxing. Referring to Figure 3, this would be the same as operating a normally tapered lift in the region of refluxing flow to the left of $U_e$ (ave.) critical. Referring again to Figure 1, the sections 11', 11" are made of larger diameter than necessary to bring the catalyst average equilibrium velocity in the critical region, whereby the catalyst ave. equilibrium velocity falls to a level below the critical which causes high attrition and refluxing in these sections. The motor 34 is then used to drive blower 30 which drives gas through conduits 31 and 32 to the heater 33. Fuel is introduced into the heater to burn either directly in the gas or indirectly in a protected region effecting an increase in the temperature of the gas. The gas is then introduced through the conduits 36, 36 to the manifolds 12, 12 located between the adjacent sections of the lift pipe. The valves 37, 37 are used to control the flow rate of the gas introduced into the lift pipe to bring the catalyst equilibrium velocity in each section of the pipe within the critical region where the refluxing is eliminated and the catalyst attrition is reduced. This provides a lift operation more flexible for different operating conditions and applications than a lift which is simply tapered without intermediate gas injection.

Referring now to Figure 2, the gas lift is shown incorporated in a moving bed conversion system. The lift pipe has a uniformly increasing cross-section at its upper end. The settling vessel or separator 40 is made large enough to serve in dual capacity, both as a separating means and a surge hopper to allow for irregularities in catalyst flow through the moving bed system. The conduit 41 serves as an elongated feed leg to transfer the catalyst from the hopper 40 into the reaction vessel 42. The reaction vessel may be operated at a pressure which is higher than that of the separator, i.e., 5–30 p.s.i. (gauge), and the catalyst will feed into the vessel through the conduit 41 without valves or restrictions, provided the leg is suitably shaped and sufficiently long. Such a feed leg is shown and claimed in copending application for Letters Patent Serial No. 108,828, filed August 5, 1949, now abandoned.

The catalyst is gravitated through the reactor 42 as a substantially compact column and contacted therein with hydrocarbons, suitably prepared for reaction, introduced through the conduit 43. The reactants may be in liquid, vapor or mixed liquid and vapor form, preheated, generally, to about 700–800° F., although higher or lower temperature may, in certain instances, be used, depending to some extent, upon the type of charging stock. The hydrocarbons are converted in the vessel upon contacting the catalyst to more desirable materials and the products are removed from the vessel through the conduit 44 to fractionation and processing apparatus, not shown. The spent catalyst is withdrawn continuously from the bottom of the vessel and introduced into a depressurizer 45, usually, where the pressure is reduced to practically atmospheric. This is done primarily because it is simpler and more economical to regenerate or restore the material at substantially atmospheric pressure. An inert gas can be introduced into the gravitating column above and below the reaction vessel in amounts sufficient to prevent the transfer of reactants from the vessel through the column.

The depressurized catalyst is gravitated downwardly as a substantially compact column through the regeneration vessel or kiln 50 wherein it is contacted with combustion supporting gas and the coke deposits are burned. The catalyst may enter the vessel at a temperature in the neighborhood of 800–1000° F. and be removed therefrom at a temperature in the neighborhood of 1100–1300° F. Temperatures higher than the above heat damage the catalyst imparing its catalytic activity. Where only a heat carrying medium is required, however, inert refractory particles, such as corhart or mullite, may be used and restored at temperatures well in excess of the above without damage. In order to control the temperature in the kiln, cooling coils may be utilized. Air is introduced into the kiln 50 through the conduit 51 and travels both upwardly and downwardly through the bed, being withdrawn through the conduits 52, 53.

The catalyst is withdrawn from the bottom of the kiln through the conduit 55. The catalyst is depressurized, if necessary, in the vessel 56, which also provides an outlet for any lift gas which passes upwardly through the catalyst column in the conduit 57.

It has been discovered that the critical catalyst average equilibrium velocity varies depending upon the length of the lift pipe and the ratio of the maximum to mean cross-section of the lift passage. For all operations where the catalyst equilibrium velocity at the upper end of the lift passage is equal to or above zero, i.e., where the lift passage does not flare out very sharply near its upper end, it has been found that in order to prevent excessive and prohibitive catalyst attrition rates the average critical catalyst equilibrium velocity $U_e$ (ave.) should be at least equal to:

$$U_e \text{ (ave.)} = 0.5(8.0+0.12\ H_t)\frac{A\ \text{max.}}{A\ \text{mean}}$$

and preferably at least equal to:

$$U_e \text{ (ave.)} = 0.5(9.6+0.132\ H_t)\frac{A\ \text{max.}}{A\ \text{mean}}$$

Hence the average linear velocity of the lift gas through the lift passage must be at least equal to that conforming to the expression, $$U_g \text{ (ave.)} = C_t \text{ (ave.)} + 0.5(8.0+0.12\ H_t)\frac{A\ \text{max.}}{A\ \text{mean}}$$

Preferably the average linear gas velocity should at least be equal to that conforming to the expression:

$$U_g \text{ (ave.)} = C_t \text{ (ave.)} + 0.5(9.6+0.132\ H_t)\frac{A\ \text{max.}}{A\ \text{mean}}$$

where $H_t$ is the total length of the lift passage in feet, A max. and A mean are respectively the maximum and mean horizontal cross-sectional areas in square feet for flow in the lift passage, and $C_t$ (ave.) is the average terminal velocity through said lift passage in feet per second of the average sized granules of catalyst. The catalyst terminal velocity is that gas velocity which will just float the catalyst granule in question under the particular operating conditions of temperature pressure and lift gas involved. The catalyst terminal velocity may be readily calculated for any given catalyst and operating conditions by use of equations and published data well known to those skilled in the art. The average catalyst terminal velocity is calculated on the basis of average temperature and pressure in the lift passage, which in turn are averaged on a volumetric increment basis. The average linear gas velocity is calculated by dividing the average volume of the total air throughput in cubic feet per second by the average horizontal cross-sectional area of the lift passage. The average area is the quotient of the total lift passage volume divided by the lift height.

In this invention the lift is overtapered, meaning that the cross-section increases between the bottom and the top of the passage, sufficient to provide $$U_g \text{ (ave.)} < C_t \text{ (ave.)} + 0.5(8.0+0.12\ H_t)\frac{A\ \text{max.}}{A\ \text{mean}}$$

when $U_g$ at the bottom is at or near the critical minimum gas velocity. Gas is introduced separately at one or more intermediate points along the lift passage to bring $U_g$ (ave.) to or above the value $$C_t \text{ (ave.)} + 0.5(8.0+0.12\ H_t)\frac{A\ \text{max.}}{A\ \text{mean}}$$

Preferably the lift is overtapered to provide $$U_g \text{ (ave.)} < C_t \text{ (ave.)} + 0.5(9.6+0.132\ H_t)\frac{A\ \text{max.}}{A\ \text{mean}}$$

when $U_g$ at the bottom is at or near the critical minimum gas velocity. Gas is then introduced at an intermediate level to maintain $U_g$ (ave.) at least equal to $$C_t \text{ (ave.)} + 0.5(9.6+0.132\ H_t)\frac{A\ \text{max.}}{A\ \text{mean}}$$

Operation of the lift in accordance with this invention provides sensitive control of the upper portion of the lift which is separate and independent from the conditions in the bottom of the lift. The lift is highly flexible and readily adapted for change in operating conditions.

It should be understood that unless otherwise stated the term linear velocity as applied to gas flow in the lift passage is intended to mean actual velocity based on the total free cross-section in the pipe less catalyst.

At the lower end of the lift passage the linear velocity should be broadly at least equal to that conforming to the equation:

$$U_g \text{ (bot)} = C_t \text{ (bot)} + (8+.12\ H_t)\frac{A\ \text{max.}}{A\ \text{mean}}$$

and preferably at least equal to that conforming to the equation:

$$U_g \text{ (bot)} = C_t \text{ (bot)} + (9.6+0.132\ H_t)\frac{A\ \text{max.}}{A\ \text{mean}}$$

where $C_t$ (bot) is the catalyst terminal velocity at the lower end of the lift pipe.

While addition of gas to the overtapered lift pipe at intermediate levels to bring the average linear gas velocity above the minimum levels above specified will in general insure suitable minimum gas velocities all along the lift passage and the invention is considered broad thereto, nevertheless, for closer control in accordance with the preferred form of this invention the gas velocity $U_g$ at any level along at least the lower 50–75% of the lift passage length and preferably along substantially the entire lift passage length from its lower end to its upper end should be brought up to at least that conforming to the relation:

$$U_g = C_t + \left[ H\left(\frac{8}{H_t}+0.12\right)\frac{A\ \text{max.}}{A\ \text{mean}} \right]$$

where H is the distance in feet below the upper end of said passage to the level in question, $H_t$ is the total length of said lift passage in feet, A (max.) is the maximum horizontal cross-sectional area of said passage in square feet, A (mean) is the mean cross-sectional area of said passage in square feet, and $C_t$ is the terminal velocity of granular material of the average size at the level in question. Even better operation may be obtained if the minimum linear gas velocity is brought up to at least $$U_g = C_t + \left[ H\left(\frac{9.6}{H_t} + 0.132\right)\frac{A \text{ max.}}{A \text{ mean}} \right]$$

It has further been found that as increasing amounts of gas are introduced into the lift at intermediate points, lifting the catalyst actual equilibrium velocity above the catalyst average critical equilibrium velocity the rate of catalyst attrition rises as shown on Figure 3. The flow rate of the gas introduced at intermediate level must be limited to prevent the average linear gas velocity in the lift passage from rising above $$U_g(\text{ave.}) = C_t(\text{ave.}) + 2.5 U_e(\text{ave.})$$

and preferably from exceeding $$U_g(\text{ave.}) = C_t(\text{ave.}) + 1.4 U_e(\text{ave.})$$

where $U_e$ (ave.) is the catalyst average equilibrium velocity and $C_t$ (ave.) is the catalyst average terminal velocity and where $U_e$ (ave.) is broadly at least equal to:

$$U_e(\text{ave.}) = 0.5(8.0 + .12 H_t)\frac{A \text{ max.}}{A \text{ mean}}$$

and preferably $$U_e(\text{ave.}) = 0.5(9.6 + 0.132 H_t)\frac{A \text{ max.}}{A \text{ mean}}$$

It was also discovered that aside from the catalyst attrition arising from insufficient or excessive gas and catalyst velocities within the lift passage additional attrition is encountered in the gas-solids separation step and that this attrition sky-rockets unless the actual catalyst velocity at the upper end of the lift passage is maintained below a critical maximum of about 35 feet per second. In view of this, in the preferred form of the invention, not only should the flow of injection gas be controlled to maintain $U_g$ above the critical minimum below which refluxing of catalyst and excessive pressure drop and attrition rates are encountered but also the flow of injection gas should be limited to prevent the catalyst discharge velocity from exceeding the critical maximum above which additional excessive attrition will occur. In general the average catalyst actual linear velocity at the upper end of the lift passage should be below about 35 feet per second and preferably below about 25 feet per second. It is preferred to maintain the average particle velocity at the upper end of the lift passage broadly above about 5.0 feet per second and preferably above about 10 feet per second. By the expression average catalyst velocity at the upper end of the lift pipe as discussed above and as employed in claiming this invention is meant the average of the linear velocities of the catalyst particles at the upper end of the lift pipe. The minimum required velocity at the upper end of the lift passage may be conveniently expressed in terms of catalyst equilibrium velocity and this has been found to be a function of the diameter of the upper end of the lift pipe. It has been found that, in order to prevent refluxing of catalyst in the upper section of the lift passage with resultant excessive catalyst attrition, the flow rate of gas injected into the overtapered passage at intermediate levels must be adjusted to maintain the average catalyst equilibrium velocity at the upper end of the lift pipe always equal to or greater than:

$$U_e(\text{top}) = 0.17 D_{top}$$

where $D_{top}$ is the internal diameter of the upper end of the lift pipe in inches.

Thus, according to a preferred form of this invention, the gas velocity $U_g$ at the bottom of the lift is set at least equal to:

$$U_g = C_t + \frac{H}{H_t}\left[ (8.0 + .12 H_t)\frac{A \text{ max.}}{A \text{ mean}} - 0.17 D_{top} \right] + 0.17 D_{top}$$

and the flow rate of the gas injected at intermediate levels is adjusted to bring $U_g$ at other levels along the overtapered lift at least up to a value expressed by the above indicated equation. In a more preferred form, the velocity at the bottom of the pipe is set at least equal to:

$$U_g = C_t + \frac{H}{H_t}\left[ (9.6 + .132 H_t)\frac{A \text{ max.}}{A \text{ mean}} - 0.17 D_{top} \right] + 0.17 D_{top}$$

and the gas injection is adjusted to bring the velocity at other points along the lift at least up to:

$$U_g = C_t + \frac{H}{H_t}\left[ (9.6 + .132 H_t)\frac{A \text{ max.}}{A \text{ mean}} - 0.17 D_{top} \right] + 0.17 D_{top}$$

In addition to controlling the velocity at any level $U_g$ in accordance with the above equations, the flow rate of gas injection should be regulated to maintain the average velocity of the catalyst particles discharged from the upper end of the lift passage below about 35 feet per second and preferably below about 25 feet per second.

The limits disclosed above for catalyst velocity at the upper end of the lift passage are broadly applicable to granular solids within the range of about ½ inch to 100 mesh Tyler (preferably 4–60 mesh), 20–130 pounds per cubic foot (preferably 30–70 #/cu. ft.) density, and 60–100 hardness (preferably 80–100) by the hardness test described hereinbelow. The critical maximum catalyst velocity at the upper end of the lift passage may vary somewhat for materials outside the specified hardness range, being lower for softer materials and high for harder materials. As to the size distribution of the contact material stream to which the above discussed critical velocity limits apply, at least about 98% of the contact material should fall within a range of particle average diameters wherein the ratio of maximum to minimum particle average diameter is below 5 and preferably below 2.5.

The hardness test referred to above is one wherein an 80cc.±2cc. sample of the granular material falling within a determined screen analysis range is poured into a 3½ inch diameter, by 3¾" high can with full top opening friction fit lid. Eight smooth surface steel balls of $^{15}\!/_{16}$ inch diameter (55±0.5 grams per ball) are added to the can. The can is then closed, positioned on a roller machine with its axis horizontal and rolled about its axis for 1 hour. The sample is then screened over a Tyler standard screen of next larger number above the number corresponding to the smallest particles in the original sample, for example, if the original sample fell within the range #3–5 Tyler screen size, a #6 Tyler screen would be used. The hardness index is the weight of material retained on the screen in the final screen analysis (i.e. the #6 screen in the above example) times 100 divided by the weight of the original sample. As an example, in the case of spherical gel catalyst granules, the catalyst is tempered at 1050° F. for 3 hours in bone dry atmosphere and screened to provide a sample falling within the range #3–5 Tyler screen size. This sample is then rolled as described and the rolled material is screened over a #6 screen using a standard Ro-Top machine.

The velocity limits discussed hereinabove further apply to operations in which the stream density in the lift passage is within the range about 0.002 to 20 pounds per cubic foot and preferably within the range about 0.5–3.0 pounds per cubic foot. The average pressure drop per foot of lift pipe may range from $1.4 \times 10^{-5}$ to 0.14 pound per square inch per foot of lift pipe length and preferably from $3.5 \times 10^{-3}$ to $2.1 \times 10^{-2}$ pounds per square inch per foot depending upon the lift height and other operating conditions. The lift passage may range from 5–400 feet and preferably 40–300 feet high and from one inch to six feet and preferably 3"–48" diameter or equivalent thereof in cross-sectional area.

The shape of the overtapered lift pipe may take many forms. It may be tapered in the form of a frusto-conical section starting at the bottom of the pipe or at some intermediate level. It may be step-wise tapered by using several sections of pipe of increasing diameter connected together in the form of a continuous pipe. Or the taper may follow a curve. In the most preferred form of the invention, the pipe walls taper outwardly from the bottom to a level near the top in accordance with a frusto-conical section, and thence taper outwardly to the top in accordance with the arc of a circle. The ratio of $$\frac{A \text{ max.}}{A \text{ mean}}$$

should be broadly about 1.5–5.0 and preferably about 1.8–3.0. The ratio of $$\frac{A \text{ min.}}{A \text{ mean}}$$

should be about 0.3–0.6 if the lower section of the lift is overtapered and otherwise should be about 0.6–0.9. In one preferred form of the invention the lower frusto-conical section of the lift pipe is tapered normally, having a ratio of $$\frac{A \text{ min.}}{A \text{ mean}}$$

of about 0.6–0.9 and the upper curved section is overtapered, having a ratio of $$\frac{A \text{ max.}}{A \text{ mean}}$$

of about 1.8 to 3.0. It is preferred that A mean be located at the top of the frusto-conical section. In general, the relation between the amount of taper and the height of the lift pipe according to the preferred form of this invention should be such that $$\frac{A_t}{A} = 1 + XH + YH^2 + ZH^3$$

where $A_t$ is the cross-sectional area at the upper end of the lift in square feet, A is the area at any given level in square feet, H is the distance in feet below the upper end of the lift pipe to that given level, X is a constant broadly between about $3 \times 10^{-3}$–$1 \times 10^{-2}$ and preferably between about $5.7 \times 10^{-3}$–$9 \times 10^{-3}$, Y is a constant broadly between about $2 \times 10^{-6}$–$1 \times 10^{-5}$ and preferably between about $3 \times 10^{-6}$–$8 \times 10^{-6}$ and Z is a constant broadly between about $1 \times 10^{-11}$–$5 \times 10^{-10}$ and preferably between about $1.2 \times 10^{-11}$–$2 \times 10^{-10}$.

The gas introduction ports in the lift pipe can be of any shape, but the preferred shape is in the form of a narrow slot horizontally about the pipe. The ports may be, however, in the form of a circular hole, a triangular hole, or even a long narrow spiral slot extending along a substantial length of the pipe.

Although all the gas may be introduced through one port at one level, where this would result in a large port causing mixing problems, it may be more desirable to use several ports of smaller area, each introducing a portion of the total gas. These ports are preferably spaced along the pipe to provide a gradual and uniform particle velocity change. Some of the suitable port locations and arrangements are summarized as follows:

(1) A continuous spiral around the upper portion of the lift pipe sized to give either a constant particle velocity or a constant rate of change of particle velocity.

(2) A plurality of orifices at equal vertical intervals either of equal area or adjusted to give the same rate of particle velocity reduction at each port.

(3) A plurality of ports spaced at such intervals and having such area that the particle deceleration rate is the same at each port and equal amounts of gas are introduced at each level.

(4) A plurality of ports of equal area arranged at such intervals that the rate of particle deceleration is substantially constant.

Of course, the size and location of gas ports required will depend, to some extent, upon the shape of the lift pipe. In Figure 2 a gradually tapered lift is used, the upper end of the lift pipe resembling an elongated funnel. The lift is tapered oversize, so that without gas introduction into the pipe 60, the particles will drop to a velocity which is too low in the tapered end of the pipe. When the average particle velocity falls too low, surging occurs in the pipe. The pressure drop across the pipe rises and an inadequate amount of catalyst is lifted. By introducing gas through the conduits 61, 62, 63, the particle average velocity can be brought up to the required velocity to effect smooth discharge with minimum catalyst breakage or attrition. The lift can be overtapered in the upper portion only so that the catalyst velocity at the top falls to a level where some of the catalyst refluxes in the upper section of the pipe. Then air or other lift gas is injected sufficient to prevent the refluxing at the top. The lift can also be overtapered to the extent that refluxing would occur along the internal portion of the lift without the injection of lift gas. Lift gas is then added at the required intermediate level to get the catalyst velocity above the refluxing velocity. Or alternatively, the lift may be overtapered only at the topmost portion to bring the discharge velocity below the range required for minimum attrition in the separation step without causing refluxing within the pipe. Lift gas is then added near the top to bring the catalyst discharge up to the prescribed velocity range for minimum attrition in the separation zone.

One example illustrating this invention involved, using a 200 foot lift having a uniform diameter of 15 inches for the lower 140 feet of pipe and a uniform diameter of 24.5 inches for the upper 60 feet of pipe. Gas can be injected into the pipe at the 140 foot level satisfactorily for the transfer of 200 tons per hour of catalyst. The catalyst comprises spherical beads having a diameter of about 0.1–0.2 inch and an apparent flowing density of 42 pounds per cubic foot. Using steam as the lift gas at a temperature of about 800° F., the pressure drop across the pipe is 4.4 pounds per square inch, the pressure at the top of the pipe is 10.6 pounds per square inch absolute. The pressure at the gas introduction port is 11.1 pounds per square inch absolute. The steam velocity in the lower end of the pipe is 103 feet per sec. and the catalyst equilibrium velocity at that location is 39 feet per sec. The gas introduced through the port is 40 percent of the total gas issuing from the top of the pipe. The resultant average catalyst velocity at the top of the pipe is 15 feet per second. The area of the port is 69 square inches.

Another example illustrating the invention involved a lift pipe having a lower frusto-conical portion extending 65 percent of the lower length. In this example the diameter of the lift passage was 25.65", 27", 29", 31.7" and 39.3" at the lower end, 50 feet up, 100 feet up, 150 feet up and 237 feet up (upper end), respectively. The mean diameter was 30.9". For this lift pipe the ratio of maximum to mean cross-sectional area was 1.62 and the ratio of minimum to mean cross-sectional area was 0.7. The critical minimum catalyst equilibrium velocity at the lower end of the lift pipe and the average for the lift pipe were about 67.2 feet per second and 33.6 feet per second respectively. In a typical operation transferring a bead form catalyst of 0.142 inch average particle diameter, and 42 pounds per cubic foot settled bed density (i.e. density measured as poured into a receptacle without further packing), 9.410 cubic feet per minute (standard conditions) air was admitted to the bottom of the lift pipe, and 3,590 cubic feet per minute injected at a level 100 feet up from the bottom, for transferring 250 tons of catalyst per hour at a temperature of about 760° F. The total pressure drop across the lift pipe was about 1.4 pounds per square inch. The linear gas velocities at the lower and upper ends of the lift pipe were 112.5 and 60.6 feet per second respectively. The catalyst equilibrium velocity at the lower and upper ends of the lift pipe were 62.1 and 11.4 feet per second respectively. The catalyst velocities in the lift pipe were 38.3 feet per second average, 48.0 feet per second maximum and 20.5 feet per second at the upper end of the lift passage. The flowing density of the lift stream was about 0.7 pound per cubic foot. The attrition under these conditions was about 1.0 ton per day for each 100 tons per hour of catalyst passed through the lift pipe. The catalyst involved in this example was a synthetic silica-alumina gel prepared in the manner described in United States Patent No. 2,384,949, issued September 18, 1945.

As another example, when using a 200 foot lift having a uniform lower section of 15 inch inside diameter, gas can be conveniently introduced at locations 20, 40 and 60 feet below the top of the pipe. The top of the pipe is formed from pipe sections 20 feet long having internal diameters of 23.3, 19.8 and 16.8 inches.

Lifting 200 tons of synthetic gel catalyst beads per hour which have a diameter of 0.1–0.2 inch and an apparent flowing density of 42 pounds per cubic foot, the gas velocity in the lower end of the pipe is 103 feet per second and the catalyst equilibrium velocity at that point is 39 feet per second. The lift gas is superheated steam at about 1000° F. with the pressure drop across the pipe being 4.5 pounds per square inch just below the lowest port, 60 feet below the top of the pipe, the gas velocity is 134.7 feet per second, and the catalyst equilibrium velocity is 62.1 feet per second. The lowest port has a cross-section of 14 square inches and 10 percent of the total gas flow through the pipe is added at that point. This results in a deceleration force of about ⅓ gravity at the location just above the inlet port. Just below the second port, 40 feet below the top of the pipe, the gas velocity is 124 feet per second and the catalyst velocity is 50.5 feet per second, substantially equilibrium velocity for the catalyst at that gas velocity. The area of the second port is 15 square inches and 10 percent of the total gas flow is introduced at that point, resulting again in a deceleration of about ⅓ gravity just above the port. The gas velocity just below the top port is 101.6 feet per second, and the catalyst velocity is 28.4 feet per second. The area of the port is 15 square inches and the gas introduction at that location is 10 percent of the total gas flow. The gas discharges from the top of the pipe at a velocity of 89.5 feet per second, and the catalyst at an average velocity of 15 feet per second. The gas pressure at the bottom of the pipe is 17.4 pounds per square inch absolute and at the three ports 13.5, 13.3, and 13.1 pounds per square inch absolute.

The above example provides equal deceleration of ⅓ gravity at each introduction port, with equal amounts of gas introduced at each port. The steam consumption in the above example is about 13,000 pounds per hour.

Referring now to Figures 4 and 5, a preferred means for introducing gas into the lift pipe is shown in elevation and plan. A housing 70 is located around the top end of one section 71 of the lift pipe. The next higher section 72 is fastened to an annular shaped plate 73 adapted to seal the annulus between the ends of the pipe sections. The plate 73 bolts to the housing 70, providing an enclosed annular chamber 74. Gas is supplied to the annular chamber 74 through the conduit 75. A multiplicity of orifices 76 are substantially equally distributed about the plate 73. The orifices are sized to provide a substantial pressure drop in the gas passing therethrough. By this means, the gas is introduced in a uniform manner about the bottom of the pipe section 72, in an upward direction. This means provides uniform gas mixing and minimum turbulence.

Figure 6 shows a system for maintaining a substantially constant catalyst discharge velocity. The catalyst discharged from the top of the lift pipe 80 contacts a moving member 81. The member 81 is slidably attached to a fixed member 82, so that it can reciprocate vertically. The spring 83 tends to keep the member 81 in a downward position and the discharging catalyst moves the member upward against the spring force. A fluid in the interior of the members transmits pressure through the conduit 84 to a controller 85. Gas is introduced into the lift pipe 80 at the juncture of the pipe sections 86, 87 through the conduit 88. The controller 85 is operatively connected to the automatic valve 89. When the moving member 81 falls because of a loss of particle discharge velocity, the valve 89 is automatically opened to introduce additional gas, thereby bringing the particle velocity back to the controlled value.

Since the particle discharge velocity is directly related to the pressure drop across the lift pipe, this fact can be used to effect automatic control of the particle discharge velocity similar to that shown in Figure 5. The pressure is measured at the bottom of the pipe and top of the pipe and the differential is then conveyed to a controller. The controller is used to operate automatic valves in gas introduction lines, similar to the scheme described hereinabove.

Referring now to Figure 7, the top of a lift pipe 90 is shown terminated within the separator 91. The inner wall of the pipe is tapered at the upper end with a gradually increasing curvature. This curve is designed to counteract the tendency of the gas velocity to increase. The pipe is overtapered so that the gas velocity in the upper end of the pipe will be too low under all normal circumstances. The gas velocity is then brought up to the required value by introducing gas through the conduits 92, 93 and 94, located at spaced points along the tapered portion of the pipe. This embodiment provides a more uniform and gradual deceleration of the particles in the upper end of the lift pipe, prior to discharge.

When the term tapered is used in this specification, it is meant to include all the schemes herein outlined for enlarging the cross-section of the upper end of the lift pipe, as well as other similar and related plans for reducing the gas velocity in the upper portion of the pipe.

It is intended that the scope of this invention be considered broadly to cover all changes and modifications of the examples of the invention chosen herein for purposes of disclosure, which do not constitute departures from the spirit of the invention.

I claim:

1. A method for transfer of granular solids from a first level to a second higher level which provides flexible control of attrition and breakage during transfer comprising: mixing said granular material at said first level with a suitable lift gas to effect its suspension therein, passing the mixed granular material and gas upwardly from said first level as a confined, substantially vertical stream, while controlling the gas velocity to provide rapid acceleration of the granular material in a lower section of said stream to a velocity above the minimum at which substantial refluxing of the granular material in the stream would occur, gradually expanding the confined stream in lateral size at successively higher levels to such an extent that the granular material would normally decelerate in velocity in an upper section of said stream below the minimum at which refluxing occurs, adding additional lift gas to the stream at an intermediate level in sufficient amount to lift the velocity of the granular material above the level at which refluxing occurs, discharging the stream into an enlarged separation zone, and limiting the maximum flow of the injected gas to provide a particle velocity which will project the granular material upwardly only a short distance in said separation zone above the level of its entry thereinto before it starts to drop.

2. A method for pneumatically conveying granular contact material from one level to a higher level which comprises, suspending said granular material in a suitable carrier gas and passing it vertically upward as a confined stream, maintaining the velocity of the catalyst throughout substantially all of the lower 50–75 percent portion of the length of said stream at a velocity substantially in excess of 25 feet per second, sufficient to insure substantially only upward flow of all of the granules, expanding the cross-section of the upper portion of the confined stream in lateral size at successively higher levels to such an extent that the average rate of contact material flow at its upper end would normally be reduced below about 10 feet per second, introducing additional lift gas into the upper portion of the stream at a controlled flow rate sufficient to maintain the discharge velocity of the contact material between about 10–25 feet per second, expanding said stream in an enlarged settling zone so that the granular material rises a short distance therein and then drops to a lower section of said zone, withdrawing carrier gas from an upper section of said zone and separately withdrawing granular material from the lower section thereof.

3. A method for pneumatically transferring granular solid material from a zone at one elevation to a second zone at a higher elevation which provides for delicate control of attrition and breakage of the solid material comprising: passing said granular material suspended in a lift gas upwardly as a confined lift stream from said first zone to said second zone, controlling the linear velocity, $U_g$, of said lift gas at the lower end of the stream at least equal to that expressed by the equation, $$U_g = C_t + \left[ H\left(\frac{8}{H_t} + 0.12\right)\frac{A \text{ max.}}{A \text{ mean}} \right]$$

where $C_t$ is the terminal velocity at the level in question of granular material of the average size material under the conditions involved, H is the distance in feet below the upper end of said stream to the level in question, $H_t$ is the total length of said lift stream in feet, A max. is the maximum horizontal cross-sectional area of said stream in square feet and A mean is the mean horizontal cross-sectional area of said stream in square feet, expanding the upper portion of the confined stream in lateral size at successively higher levels to such an extent that the linear velocity, $U_g$, of said lift gas at any level along the upper portion of the stream is less than that expressed by the equation, $$U_g = C_t + \left[ H\left(\frac{8}{H_t} + 0.12\right)\frac{A \text{ max.}}{A \text{ mean}} \right]$$

injecting additional lift gas into the stream at levels spaced along the upper portion of the stream in sufficient amounts to bring the linear velocity of said lift gas at any level along the upper portion of the stream up to at least that expressed by the equation, $$U_g = C_t + \left[ H\left(\frac{8}{H_t} + 0.12\right)\frac{A \text{ max.}}{A \text{ mean}} \right]$$

and further controlling flow rate of the injected gas streams to maintain the average linear velocity of the granular material at the upper end of said lift stream below about 35 feet per second.

4. A method for transfer of granular solid material from one level to a higher level providing independent delicate control of attrition and breakage of the granular material at several levels which comprises: mixing said granular material with a lift gas in a zone at the lower level and passing the granular material suspended in said lift gas upwardly as a confined substantially vertical stream into a separation zone of substantially greater horizontal cross-section than said confined stream, controlling the rate of lift gas supply to maintain the linear velocity of the lift gas ($U_g$) along the lower portion of the confined stream at least equal to that required by the equation, $$U_g = C_t + \frac{H}{H_t}\left[ (9.6 + .132\, H_t)\frac{A \text{ max.}}{A \text{ mean}} - 0.17\, D_{top} \right] + 0.17\, D_{top}$$

where $C_t$ is the terminal velocity at the level in question of granular material of the average size material under the conditions involved, H is the distance in feet below the upper end of said stream to the level in question, $H_t$ is the total length of said lift stream in feet, $D_{top}$ is the diameter of the lift stream at its upper end, A max. is the maximum horizontal cross-sectional area of said stream in square feet and A mean is the mean horizontal cross-sectional area of said stream in square feet, expanding the upper portion of the stream laterally to effect a reduction of the gas velocity below that expressed by the above equation and introducing additional suspension gas into the stream at intermediate levels to bring the gas velocity at least above that expressed by the equation, limiting the amount of gas introduced at intermediate level into the stream to maintain the average velocity of the granualar material at the upper end thereof below about 25 feet per second, reversing the direction of the granular material flow after it discharges into said second zone and dropping it down onto a bed thereof maintained in said second zone.

5. In a system wherein a granular contact material is passed cyclically through two contacting chambers, one being a conversion chamber wherein it flows downwardly as a substantially compact column while contacting a fluid hydrocarbon charge to effect conversion of said charge to gasiform products and the other zone being a reconditioning chamber wherein the contact material flows downwardly as a substantially compact column while being contacted with a suitable gas to effect its reconditioning for reuse in said conversion chamber, the improved apparatus for controlling attrition of the contact material during transfer from one of said contacting chambers to the other which comprises in combination, a lift feed chamber located below one of said contacting chambers, conduit means for flow of contact material from said contacting chamber to the upper section of said feed chamber, a separation chamber having a gas outlet near its upper end positioned at a location elevationally above the other of said contacting chambers, members defining a passage for contact material flow from the lower section of said separation chamber to said other contacting chamber, a tapered lift pipe extending upwardly from a location within the lower section of but above the bottom of said feed chamber to a location within said separation chamber intermediate the upper and lower ends thereof, said lift conduit taking approximately the form of an inverted hollow frustrum of a cone along at least the lower 50–75% portion of the length of said conduit and having its sides along the remaining upper 25–50% of its length flared approximately along the arc of a circle, the ratio of the horizontal cross-sectional area of said conduit at the base of said lower portion to that at the upper end of said lower portion of said conduit being about 0.6–0.9 and the ratio of the horizontal cross-sectional areas at the upper end to that at the lower end of said upper portion of said conduit being about 1.5–5.0, the upper end of said lift conduit being of substantially less horizontal cross-sectional area than said separation chamber, means to supply a lift gas to the lower end of said lift conduit and means to supply additional lift gas to the upper portion of said conduit whereby attrition of the contact material in the upper portion of the lift conduit can be controlled independent of that occurring in the remainder of the lift.

(References on following page)

References Cited in the file of this patent

UNITED STATES PATENTS

| | | |
|---|---|---|
| 568,445 | Kennedy | Sept. 29, 1896 |
| 1,597,438 | Ennis | Aug. 24, 1926 |
| 2,398,759 | Angell | Apr. 23, 1946 |
| 2,561,771 | Ardern | July 24, 1951 |
| 2,663,595 | Ardern | Dec. 22, 1953 |
| 2,684,873 | Berg | July 27, 1954 |
| 2,687,919 | Bullington | Aug. 31, 1954 |
| 2,697,640 | Newman | Dec. 21, 1954 |
| 2,739,845 | Berg | Mar. 27, 1956 |

OTHER REFERENCES

New Houdriflow Cracking Unit etc., vol. 5, Petroleum Processing, June 1950, pages 601 to 605.

UNITED STATES PATENT OFFICE
CERTIFICATE OF CORRECTION

Patent No. 2,978,279                      April 4, 1961

Eric V. Bergstrom

It is hereby certified that error appears in the above numbered patent requiring correction and that the said Letters Patent should read as corrected below.

Column 5, line 66, for "increaes" read -- increases --; column 7, line 16, for "imparing" read -- impairing --; column 12, line 69, for "9.410" read -- 9,410 --.

Signed and sealed this 30th day of January 1962.

(SEAL)
Attest:

ERNEST W. SWIDER
Attesting Officer

DAVID L. LADD
Commissioner of Patents